(12) United States Patent
Terry (10) Patent No.: US 12,508,712 B2
(45) Date of Patent: Dec. 30, 2025

(54) CONTACT MANAGEMENT MODE FOR ROBOTIC IMAGING SYSTEM USING MULTIPLE SENSORS

(71) Applicant: Alcon Inc., Fribourg (CH)

(72) Inventor: Patrick Terry, Goleta, CA (US)

(73) Assignee: Alcon, Inc, Fribourg (CH)

( * ) Notice: Subject to any disclaimer, the term of this patent is extended or adjusted under 35 U.S.C. 154(b) by 198 days.

(21) Appl. No.: 18/457,788

(22) Filed: Aug. 29, 2023

(65) Prior Publication Data

US 2024/0066704 A1  Feb. 29, 2024

Related U.S. Application Data

(60) Provisional application No. 63/373,890, filed on Aug. 30, 2022.

(51) Int. Cl.
| | |
|---|---|
| *B25J 9/16* | (2006.01) |
| *A61B 3/14* | (2006.01) |
| *A61B 34/20* | (2016.01) |
| *A61B 34/30* | (2016.01) |
| *A61B 90/00* | (2016.01) |
| *A61B 90/25* | (2016.01) |
| *A61B 90/50* | (2016.01) |
| *B25J 13/02* | (2006.01) |
| *B25J 15/00* | (2006.01) |

(52) U.S. Cl.
CPC .............. *B25J 9/1674* (2013.01); *A61B 3/14* (2013.01); *B25J 13/025* (2013.01); *B25J 15/0019* (2013.01)

(58) Field of Classification Search
CPC .... B25J 9/1674; B25J 13/025; B25J 15/0019; A61B 3/14; A61B 90/25; A61B 34/30; A61B 2034/2048; A61B 2090/065; A61B 2560/0437; A61B 90/50; A61B 90/361
See application file for complete search history.

(56) References Cited

U.S. PATENT DOCUMENTS 11,051,897 B2 * 7/2021 Namiki ................. A61B 34/10
2010/0094312 A1   4/2010 Ruiz Morales et al.
(Continued)

FOREIGN PATENT DOCUMENTS

CN    105082161 B    9/2017
WO    2022144640 A1  7/2022

*Primary Examiner* — Harry Y Oh
(74) *Attorney, Agent, or Firm* — Nayyer J. Siddiqi; Quinn IP Law (57) ABSTRACT

A robotic imaging system includes a body with a head unit, a robotic arm and a coupling plate. A camera is positioned in the head unit and configured to record one or more images of a target site. The camera is operatively connected to one or more handles. A plurality of sensors is configured to transmit sensor data. The sensors include at least one primary sensor configured to detect respective force and/or respective torque applied at the body and at least one auxiliary sensor configured to detect the respective force and/or the respective torque applied at the one or more handles. A controller is configured to receive the sensor data and execute a contact management mode, including determining a contact location of the body with an external object based in part on the sensor data and determining a reverse trajectory for moving the body away from the contact location.

18 Claims, 6 Drawing Sheets

(56) References Cited

U.S. PATENT DOCUMENTS

| | | | |
|---|---|---|---|
| 2011/0301758 A1* | 12/2011 | Nakajima | B25J 9/1633 |
| | | | 901/3 |
| 2016/0221193 A1* | 8/2016 | Sato | B25J 13/085 |
| 2018/0079090 A1* | 3/2018 | Koenig | B25J 18/04 |
| 2021/0298846 A1* | 9/2021 | Dozeman | A61B 90/03 |
| 2022/0297958 A1* | 9/2022 | Moreno | B25J 9/1689 |
| 2022/0378523 A1* | 12/2022 | Tobergte | B25J 9/1689 |
| 2024/0065781 A1* | 2/2024 | Gao | G06T 7/64 |
| 2024/0148455 A1* | 5/2024 | Donovan | A61B 34/30 |

* cited by examiner

CONTACT MANAGEMENT MODE FOR ROBOTIC IMAGING SYSTEM USING MULTIPLE SENSORS

CROSS-REFERENCE TO RELATED APPLICATION

The present application claims the benefit of priority to U.S. Provisional Application No. 63/373,890, filed Aug. 30, 2022, which is hereby incorporated by reference in its entirety.

INTRODUCTION

The present disclosure relates generally to a robotic imaging system. More specifically, the disclosure relates to a contact management mode in a robotic imaging system. Various imaging modalities are commonly employed to image different parts of the human body. Robotic systems have been developed to improve the efficiency of medical procedures employing these imaging modalities. The robotic systems may incorporate multiple parts or components to assist users in operating the system. As such, it may be challenging to avoid physical contact between the various components of the robotic system and external objects (including persons) in the surroundings.

SUMMARY

Disclosed herein is a robotic imaging system having a body with a head unit, a robotic arm and a coupling plate coupling the head unit to the robotic arm. The robotic arm is adapted to selectively move the head unit. A camera is positioned in the head unit and configured to record one or more images of a target site. The camera is operatively connected to one or more handles. The system includes a plurality of sensors configured to transmit sensor data. The sensors include at least one primary sensor configured to detect respective force and/or respective torque applied at the body and at least one auxiliary sensor configured to detect the respective force and/or the respective torque applied at the one or more handles. A controller is configured to receive the sensor data. The controller has a processor and tangible, non-transitory memory on which instructions are recorded. The controller is adapted to execute a contact management mode, including determining a contact location of the body with an external object, based in part on the sensor data. The contact management mode includes determining a reverse trajectory for moving the body away from the contact location.

The camera may be a stereoscopic camera configured to record a left image and a right image for producing at least one stereoscopic image of the target site. The target site may be an eye. The plurality of sensors may respectively include a six-degrees-of-freedom haptic force-sensing device.

The handles include a first handle and a second handle rigidly affixed to and connected by a handlebar. In some embodiments, the auxiliary sensor may be a single sensor positioned on the handlebar. In other embodiments, the auxiliary sensor includes a first auxiliary sensor affixed to the first handle and a second auxiliary sensor affixed to the second handle. The primary sensor may be located at a center point between the robotic arm and the camera. The plurality of sensors defines respective frames of reference.

In some embodiments, the controller is adapted to transform the respective frames of reference to a common frame. The controller may be adapted to apply correction factors to the sensor data, including applying a low-pass filter and/or correcting for gravity for the plurality of sensors based on their respective location. The controller may be adapted to obtain a boundary plane extending through the contact location and perpendicular relative to a first direction. The reverse trajectory begins in a direction orthogonal to the boundary plane.

In some embodiments, the reverse trajectory is constrained to a surface of a virtual sphere. The sensor data provides a measured torque and a measured force at a measured location, with the measured location and the contact location being connected by a displacement vector. The controller may be adapted to determine the applied torque at the contact location as a difference between the measured torque and an applied force crossed with the displacement vector.

Disclosed herein is a robotic imaging system having a body including a head unit, a robotic arm and a coupling plate coupling the head unit to the robotic arm. The robotic arm is adapted to selectively move the head unit. A camera is positioned in the head unit and configured to record one or more images of a target site. The camera is operatively connected to one or more handles. The system includes a plurality of sensors configured to transmit sensor data. The plurality of sensors includes at least one primary sensor configured to detect respective force and/or respective torque applied at the body and at least one auxiliary sensor configured to detect the respective force and/or the respective torque applied at the one or more handles.

A controller is configured to receive the sensor data, the controller having a processor and tangible, non-transitory memory on which instructions are recorded. The controller is adapted to execute a contact management mode, including obtaining a contact location of the body with an external object based in part on the sensor data, obtaining a boundary plane extending through the contact location, and determining a reverse trajectory for the body to move away from the contact location. The boundary plane is perpendicular to a reference axis.

The above features and advantages and other features and advantages of the present disclosure are readily apparent from the following detailed description of the best modes for carrying out the disclosure when taken in connection with the accompanying drawings.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 1:
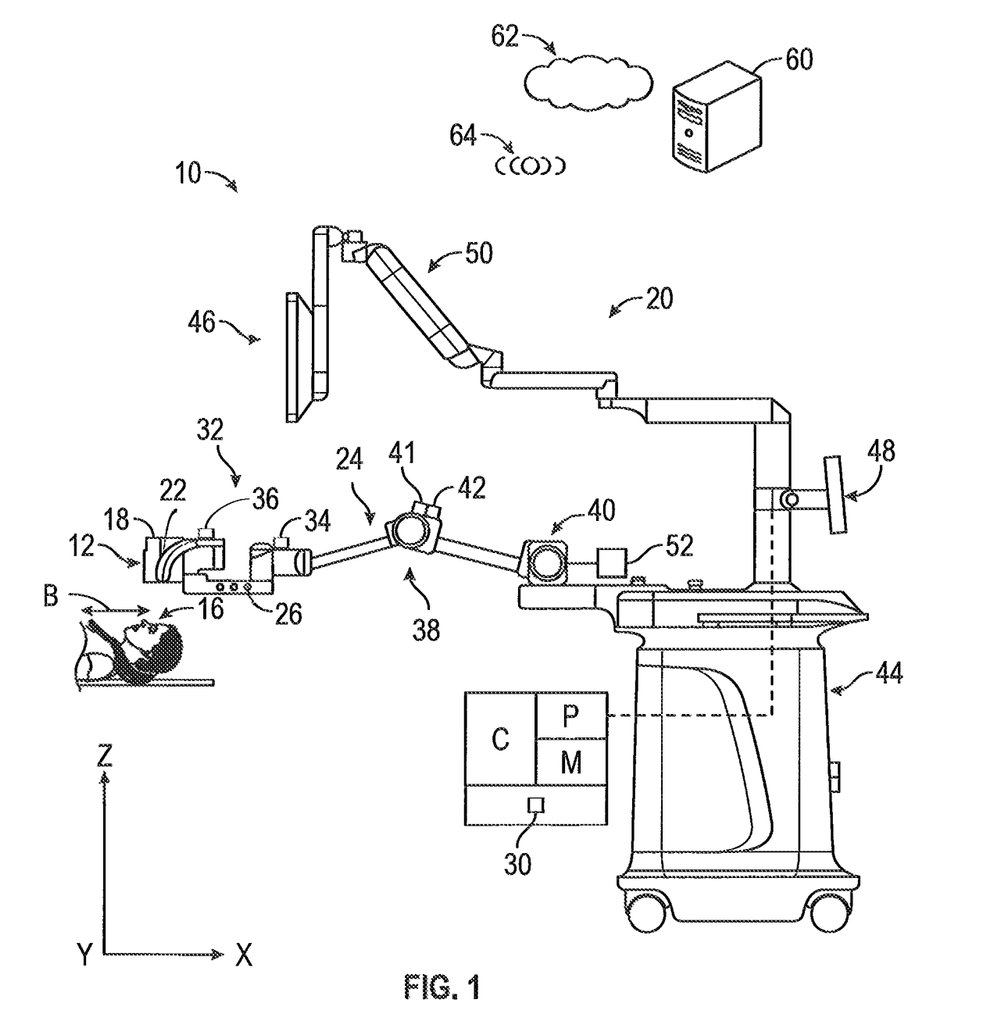
FIG. 1 is a schematic fragmentary diagram of a robotic imaging system having a camera, sensors and a controller with a contact management mode.
Figure 2:
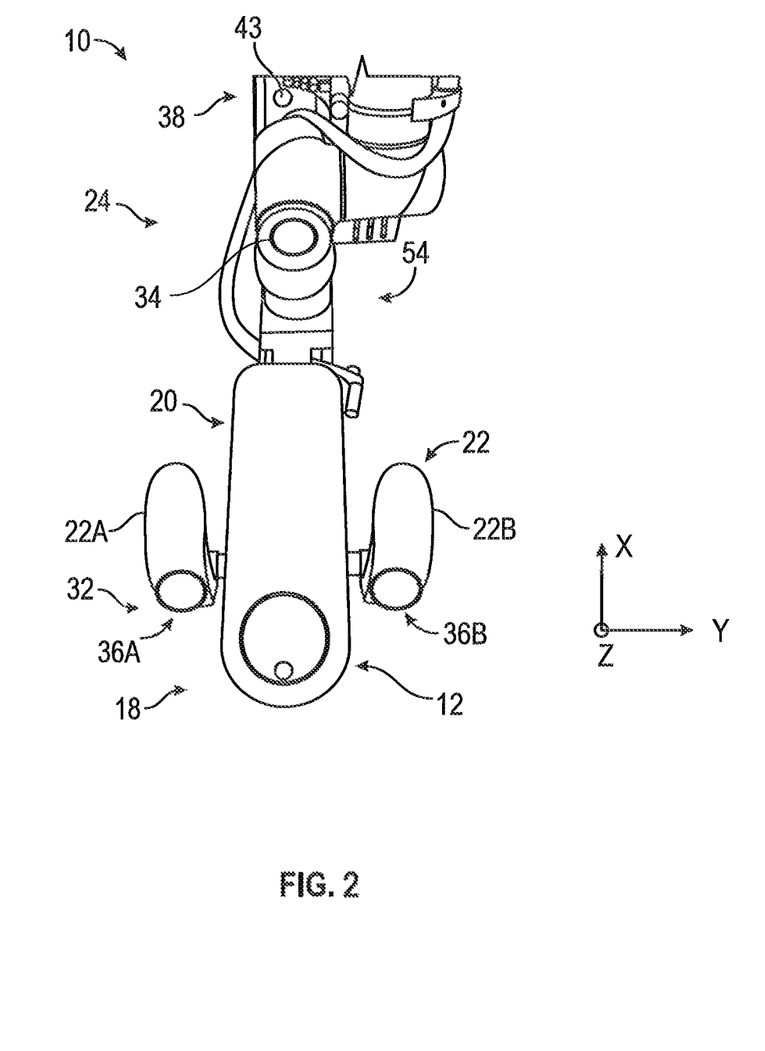
FIG. 2 is a schematic fragmentary top view of the robotic imaging system of FIG. 1.

Referring to the drawings, wherein like reference numbers refer to like components, FIGS. 1-2 schematically illustrate a robotic imaging system 10 having a camera 12. While the camera 12 shown in FIG. 1 is a stereoscopic camera 12, it is understood that other types of cameras may be employed (e.g., those taking a single image). The camera 12 is configured to record first and second images of a target site 16, which may be employed to generate a live two-dimensional stereoscopic view of the target site 16. The target site 16 may be an anatomical location on a patient, a laboratory biological sample, calibration slides/templates, etc. In one example, the target site 16 is an eye.

A top view of the robotic imaging system 10 is shown in FIG. 2. Referring to FIGS. 1-2, the camera 12 is at least partially located in a head unit 18 of a body 20. The head unit 18 is configured to be at least partially directed towards the target site 16. One or more handles 22 ("one or more" omitted henceforth) are operatively connected to the camera 12 (e.g., at the head unit 18) to allow a user to manually position the camera 12. The handles 22 may include respective controls for activating or selecting specific features of the camera 12, such as focus, magnification, adjusting an amount/type of light projected onto the target site 16 and other features. Referring to FIG. 2, the handles 22 may include a first handle 22A and a second handle 22B. While the example shows two handles, it is understood that the number and shape/form of the handles 22 may be varied.

Referring to FIG. 1, the body 20 includes the head unit 18 housing the camera 12, a robotic arm 24 and a coupling plate 26. The robotic arm 24 is configured to selectively move the camera 12 via the head unit 18. The user may position and orient the camera 12 with assistance from the robotic arm 24. The coupling plate 26 mechanically couples the head unit 18 to the robotic arm 24.

Referring to FIG. 1, the robotic imaging system 10 includes a controller C having at least one processor P and at least one memory M (or non-transitory, tangible computer-readable storage medium) on which instructions are recorded for executing method 100, described below with respect to FIG. 3, of operating a contact management mode 30. As described below, the contact management mode 30 utilizes redundant force/torque sensors to accurately detect potential contact of the body 20 on a reference axis (e.g., the Z-axis) and reverse the body 20 out of the potential contact. The memory M can store controller-executable instruction sets, and the processor P can execute the controller-executable instruction sets stored in the memory M.

As shown in FIGS. 1-2, the system 10 includes a plurality of sensors 32, including at least one primary sensor 34 configured to detect respective force and/or respective torque applied at the body 20, and at least one auxiliary sensor 36 configured to detect the respective force and/or respective torque applied at the handles 22. When a part of the body 20 comes in contact with an external object (e.g., object 400 in FIG. 6), the sensor readings from the primary sensor 34 and the auxiliary sensor 36 will vary, enabling detection of an example contact location 402. This may be done using the weighted differences of the two sensor readings.

As described below, once contact is detected, the controller C defines a boundary plane B (see FIGS. 1 and 6) and a reverse trajectory (e.g., reverse trajectory 406 in FIG. 6) is commanded. In some embodiments, no user intervention is required and the robotic arm 24 is moved relatively fast. In other embodiments, the user may be required to keep a button engaged for motion to occur. The contact management mode 30 acts on acceleration dynamics to mitigate contact of the various components of the body 20 with external objects in the surrounding. The method 100 described herein provides smooth transitions and is integrated into the dynamics of the control system.

The sensors 32 may include a six-degrees-of-freedom haptic force-sensing module. Here, the sensors 32 may detect translational force or motion in the X-axis, Y-axis, and Z-axis and separately detect torque or motion around a yaw-axis, a pitch-axis, and a roll-axis. In addition to force and torque sensors, linear accelerometers and rotational gyros may be employed. The detected force/movement is converted into rotational and/or translational data. The decoupling of the translational force and the rotational force enables the robotic imaging system 10 to calculate direct and/or reverse kinematics for controlling the robotic arm 24.

Figure 4:
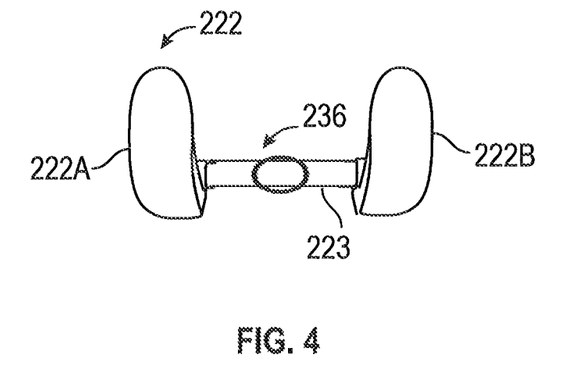
FIG. 4 is a schematic fragmentary perspective view of the positioning of sensors in the system of FIG. 1, in accordance with an alternative embodiment.

Referring to FIG. 2, the primary sensor 34 may be located at a center point 54 between the robotic arm 24 and the camera 12. In the embodiment shown in FIG. 2, there are two auxiliary sensors: a first auxiliary sensor 36A affixed to the first handle 22A and a second auxiliary sensor 36B affixed to the second handle 22B. An alternative embodiment is shown in FIG. 4, with a single auxiliary sensor for the handle 222. Referring to FIG. 4, a handlebar 223 connects the first handle 222A and the second handle 222B. In FIG. 4, the auxiliary sensor is a single auxiliary sensor 236 rigidly affixed to the handlebar 223. The number of sensors 32 may vary based on the application at hand.

The sensors 32 may include an opto-sensor with an electro-optical device configured to transform applied forces and/or torques into electrical signals. It is understood that other types of sensor technologies may be employed. For example, the sensors 32 may include a strain gauge or piezoelectric device that is configured to sense a haptic signal.

Referring to FIG. 1, the robotic arm 24 includes one or more joints, such as first joint 38 and second joint 40, configured to provide further degrees of positioning and/or orientation of the head unit 18. The data from the sensors 32 may be employed to determine which joints of the robotic arm 24 are to be rotated and how quickly the joints should be rotated, in order to provide assisted movement of the camera 12. Referring to FIG. 1, a respective joint motor (such as joint motor 41) and a respective joint sensor (such as joint sensor 42), may be coupled to each joint. The joint motor 41 is configured to rotate the first joint 38 around an axis, while the joint sensor 42 is configured to transmit the position (in 3D space) of the first joint 38. Referring to FIG. 2, a joint extrusion point 43 in the joint 38 is shown.

The robotic arm 24 may include an assisted drive function incorporating a user-guided control system, enabling the user to gently steer the camera 12 in a desired direction. In one embodiment, a user may hold the handles 22 and actuate or push a release button. Actuation of the release button causes the camera 12 to transmit a message to the controller C indicative that a user desires to begin the assisted drive function. During this movement, the controller C causes the robotic arm 24 and/or the coupling plate 26 to move the camera 12 in a "power steering" manner, safely supporting its weight and automatically determining which joints should be activated and which should be braked in a coordinated manner to achieve the user's desired movement. In some embodiments, the robotic arm 24 may permit user movement without assistance, or at least initial assistance.

Referring to FIG. 1, the head unit 18 may be connected to a cart 44 having at least one display medium (which may be a monitor, terminal or other form of two-dimensional visualization), such as first and second displays 46 and 48 shown in FIG. 1. Referring to FIG. 1, the controller C may be configured to process signals for broadcasting on the first and second displays 46 and 48. The body 20 may be self-contained and movable between various locations. The image stream from the camera 12 may be sent to the controller C and/or a camera processor (not shown), which may be configured to prepare the image stream for viewing. For example, the controller C may combine or interleave first and second video signals from the camera 12 to create a stereoscopic signal. The controller C may be configured to store video and/or stereoscopic video signals into a video file stored to memory M. The first and second displays 46 and 48 may incorporate a stereoscopic display system, with a two-dimensional display having separate images for the left and right eye respectively. To view the stereoscopic display, a user may wear special glasses that work in conjunction with the first and second displays 46, 48 to show the left view to the user's left eye and the right view to the user's right eye.

Referring to FIG. 1, the first display 46 may be connected to the cart 44 via a flexible mechanical arm 50 with one or more joints to enable flexible positioning. The flexible mechanical arm 50 may be configured to be sufficiently long to extend over a patient during surgery to provide relatively close viewing for a surgeon. The first and second displays 46, 48 may include any type of display, such as a high-definition television, an ultra-high-definition television, smart-eyewear, projectors, one or more computer screens, laptop computers, tablet computers, and/or smartphones and may include a touchscreen.

The camera 12 is configured to acquire images of the target site 16, which may be presented in different forms, including but not limited to, captured still images, real-time images and/or digital video signals. "Real-time" as used herein generally refers to the updating of information at the same rate as data is received. More specifically, "real-time" means that the image data is acquired, processed, and transmitted at a high enough data rate and a low enough delay that when the data is displayed, objects move smoothly without user-noticeable judder or latency. Typically, this occurs when new images are acquired, processed, and transmitted at a rate of at least about 30 frames per second (fps), displayed at about 60 fps and when the combined processing of the video signal has no more than about $\frac{1}{30}^{th}$ second of delay.

Referring to FIG. 1, the robotic arm 24 (and/or coupling plate 26) may be controlled via the controller C and/or an integrated processor, such as a robotic arm controller 52. The robotic arm 24 may be selectively operable to extend a viewing range of the camera 12 along an X-axis, a Y-axis and a Z-axis. The robotic arm controller 52 may include a processor, a server, a microcontroller, a workstation, etc., configured to convert one or more messages or instructions from the controller C into messages and/or signals that cause any one of the joints to rotate. The robotic arm controller 52 is also configured to receive and convert sensor information, such as joint position and/or speed from the robotic arm 24 and/or the coupling plate 26 into one or more messages for the controller C. U.S. application Ser. No. 16/398,014 (filed on Apr. 29, 2019), the contents of which is hereby incorporated by reference in its entirety, describes a stereoscopic visualization camera with an integrated robotics platform.

Figure 3:
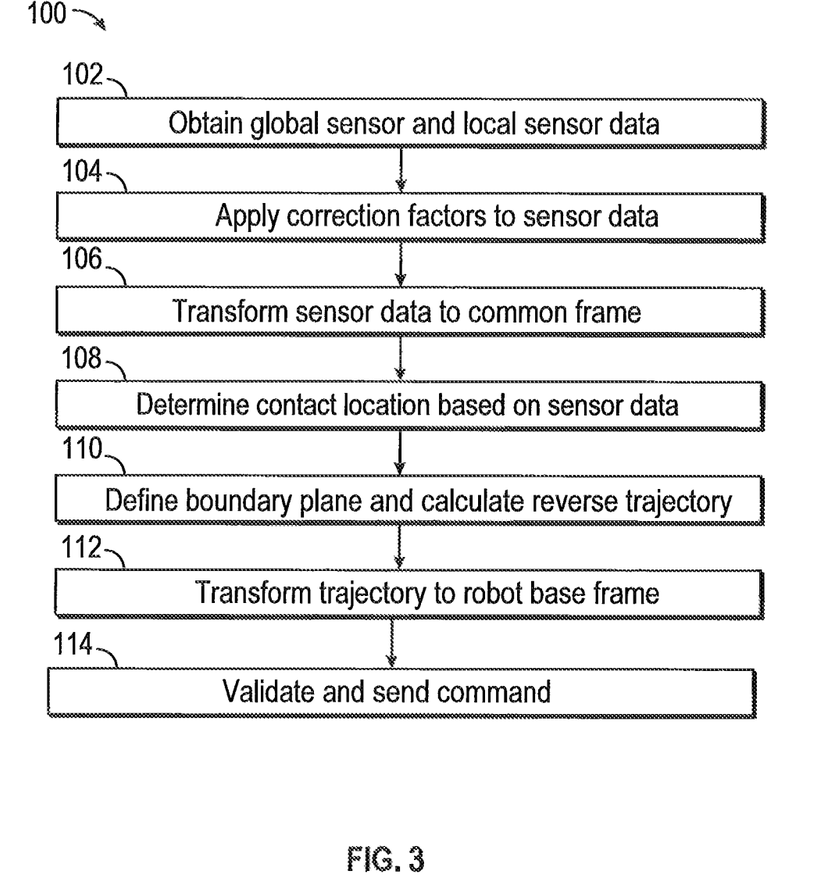
FIG. 3 is a flowchart of an example method for operating the contact management mode.

Referring now to FIG. 3, a flowchart is shown of an example method 100 for operating the contact management mode 30 of FIG. 1. Method 100 may be embodied as computer-readable code or instructions stored on and partially executable by the controller C of FIG. 1. Method 100 need not be applied in the specific order recited herein and may be dynamically executed. Furthermore, it is to be understood that some steps may be eliminated. Method 100 may be executed periodically or at predefined time intervals.

Method 100 begins with block 102 of FIG. 3, where the controller C is programmed to receive the sensor data from the sensors 32, including an input force vector and/or an input torque vector representing the detected forces and detected torque, respectively. In other words, the sensors 32 measure six degrees of freedom ($F_x$, $F_y$, $F_z$, $T_x$, $T_y$ and $T_z$). Also, per block 102, the controller C receives the joint position data of the robotic arm 24.

Advancing to block 104 in FIG. 3, the method 100 includes applying correction factors to the sensor data. Sensor loading varies with the orientation of its location on the body 20 relative to gravity and the acceleration or deceleration during movements of the robotic arm 24. Correction factors are applied to compensate for these effects. For example, the controller C is programmed to calculate gravitational force and apply gravity compensation by removing the effects of Earth's gravity from the sensor data. The effect of gravity for each sensor may be removed in world coordinates (e.g., robot base frame) as (-mg), where m is the mass of the sensor and g is the gravitational constant. Gravity calculation software available to those skilled in the art may be employed. Also, per block 106, the method 100 may include filtering the sensor data, e.g., with a first low-pass filter, a second low-pass filter, and/or a notch filter that targets cart vibrations. It is understood that the order of the blocks may be changed.

Figure 5:
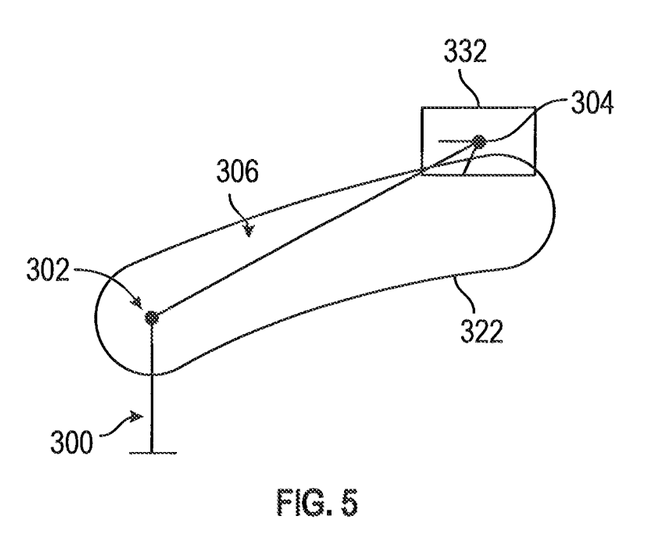
FIG. 5 is a schematic fragmentary diagram illustrating a handle and auxiliary sensor employable in the system of FIG. 1.

Proceeding to block 106 of FIG. 3, the controller C is programmed to transform the respective sensor frames (of the sensors 32) to a common frame (e.g., camera frame or robot base frame or another reference frame). The sensors 32 are placed in a common frame such that they may be compared. As noted above, at least one auxiliary sensor 36 is loading just the handles 22 and at least one primary sensor 34 is loading the body 20, including the coupling plate 26, handles 22 and the camera 12. FIG. 5 shows an example torque transformation from an applied force/torque 300 (at a first location 302) to a measured location 304 on a handle 322. A sensor 332 is affixed to the handle 322. The sensor 332 provides a measured torque and a measured force at the measured location 304, which coincides with the origin or center of the sensor 332.

Referring to FIG. 5, the applied force at the first location 302 is identical to the measured force at the measured location 304. The measured location 304 and the first location 302 are connected by a displacement vector 306. The transformation may be characterized as:

$$\begin{bmatrix} \text{Measured Force} \\ \text{Measured Torque} \end{bmatrix} = \begin{bmatrix} I & 0 \\ [d]_x & I \end{bmatrix} \begin{bmatrix} \text{Applied Force} \\ \text{Applied Torque} \end{bmatrix}$$

Here, I is a 3 by 3 identity matrix and 0 is a 3 by 3 zero matrix. The torque is the force (including the static, dynamic, and working forces) multiplied by the distance from the sensor origin (e.g., measured location 304) to the point (e.g., first location 302) at which the force is applied. Additionally, $[d]_x$ is the matrix formulation of a cross product, which is expressed as the product of a skew-symmetric matrix and a vector (See: https://en.wikipedia.org/wiki/Cross_product, the section entitled "Conversion to matrix multiplication"). The controller C may be adapted to determine the applied torque ($\tau_{applied}$) at the first location 302 as a difference between the measured torque ($\tau_{measured}$) and the applied force ($\tau_{applied}$) crossed with the displacement vector 306 (d) as follows:

$$[\tau_{applied} = \tau_{measured} - (F_{applied} \times d)].$$

Figure 6:
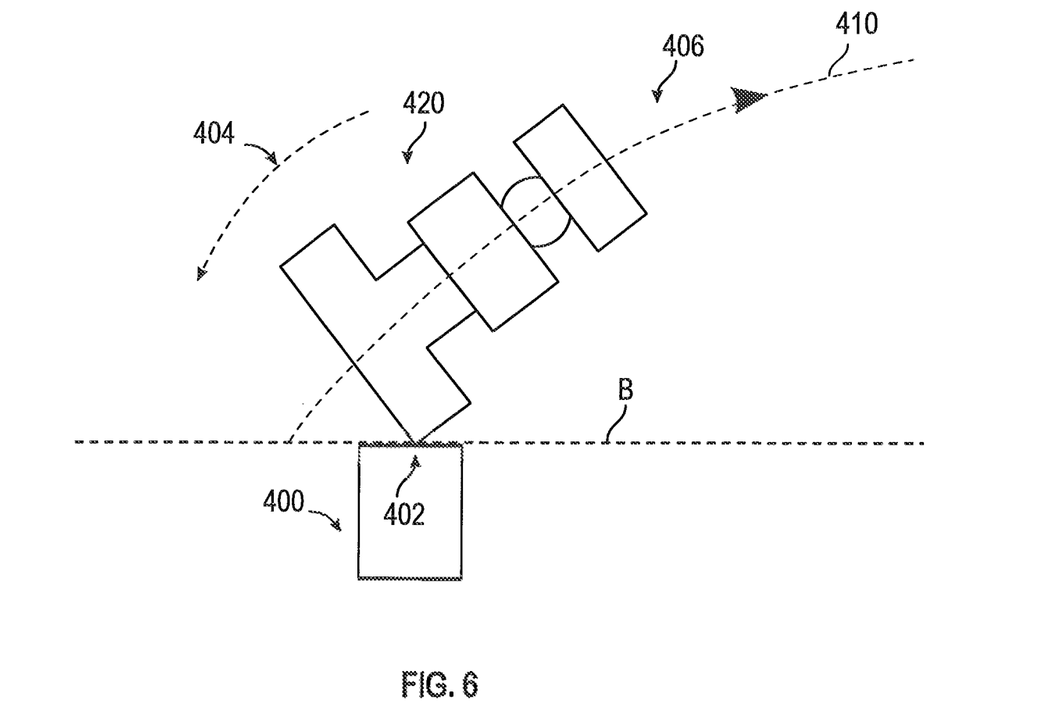
FIG. 6 is a schematic fragmentary diagram illustrating a reverse trajectory for the system of FIG. 1.

Advancing to block 108 in FIG. 3, when a part of the body 420 comes in contact with an external object 400 as shown in FIG. 6, the controller C is programmed to determine the contact location 402 based on the sensor data. The incoming path 404 of the body 420 is also shown in FIG. 6. The contact location 402 may be calculated with respect to a fixed coordinate frame (for example, either a camera frame or a robot base frame), which may be chosen or varied based on the application at hand.

Proceeding to block 110 of FIG. 3, the method 100 includes defining a boundary plane B (see FIG. 6) at the contact location 402 and calculating a reverse trajectory 406 for the body 420. The boundary plane B extends through the contact location 402 and is perpendicular relative to a first direction that is pre-selected (e.g., the Z-axis in FIG. 1). The reverse trajectory 406 begins in a direction orthogonal to the boundary plane B. The controller C is adapted to calculate and provide a repulsing force that gently pushes the body 420 in reverse away from the contact location 402.

Figure 7:
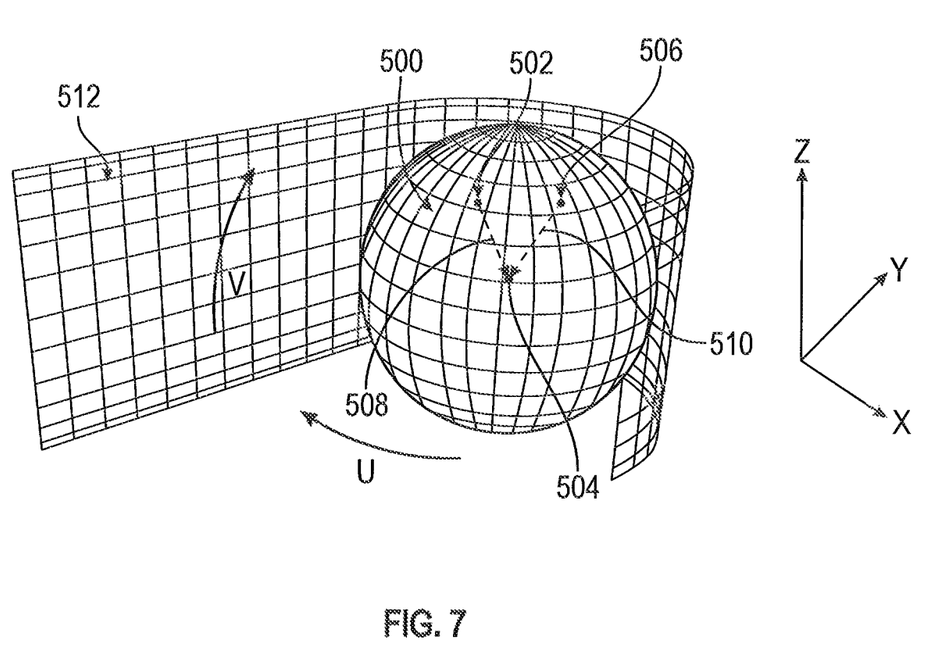
FIG. 7 is a schematic diagram of a virtual sphere illustrating an example constrained trajectory for the system of FIG. 1.

In some embodiments, motion of the body 20 requires moving along a constrained trajectory. In these cases, it may not always be possible to reverse the body 20 out of position directionally. For example, the motion of the body 20 may be restricted to the surface of a virtual sphere. FIG. 7 is a schematic diagram of an example virtual sphere 500 representing the surface of a constrained trajectory. Here, a given point on the outer surface 502 of the virtual sphere 500 may be expressed in terms of rotational sphere angles V and U. A view vector 508 of the camera 12 points to the center 504 of the virtual sphere 500, which has the same coordinates in XYZ space as a selected point in the target site 16. The controller C and/or the robotic arm controller 52 may be adapted to convert 'up', 'down', 'left', and 'right' from camera coordinates to robot base frame coordinates, which are provided as X and Y vectors. The X and Y vectors are used by the controller C and/or the robotic arm controller 52 for directly determining how the camera 12 is to move on the virtual sphere 500 to determine the end location 506 (with view vector 510). Alternatively, the virtual sphere 500 may be represented by a different shape and the outer surface 502 may be represented by a planar surface 512.

Referring to FIG. 6, the reverse trajectory 406 may be constrained to the surface of a sphere 410. To maintain the constrained trajectory, the robotic arm 24 reverses out along the trajectory, using an input force calculated through feedback control with a closed-loop control module. The closed-loop control module may be a proportional-integral controller, a proportional-derivative controller or a proportional-integral-derivative controller. For example, using a proportional-derivative controller the input force (F boundary plane) may be obtained as $[F\_{boundary\ plane} = K_p(Z_0 - z) +$ $K_d(0 - \dot{z})$, where z denotes the position of the body 420, $\dot{z}$ denotes the speed of the reverse trajectory 406 and $Z_0$ denotes the position of the boundary plane B. The boundary plane B is assumed to be perpendicular to the Z-axis (first direction) at $Z_0$. Additionally, Kp and Kd are the proportional and derivative constants, respectively, from the proportional-derivative controller, with the process variable being a difference between the boundary plane B and the current position (z). The constants Kp and Kd may be tuned via a calibration process with known changes in position and speed. The controller C may inject a small amount of damping to the control system dynamics, to improve smoothness and eliminate oscillations.

Obtaining the sequence of the reverse trajectory 406 may include using inverse kinematics and/or Jacobian kinematics (e.g., an inversion of a Jacobian matrix). The controller C determines a movement sequence that specifies how certain joints of the robotic arm and/or coupling plate 26 are to move in a coordinated manner and specifies, for example, joint rotation speed, joint rotational direction, and/or joint rotational duration. The joints of the robotic arm 24 and/or coupling plate 26 may rotate individually or have overlapping movement depending on the movement sequence. The Jacobian kinematic equations define how certain joints of the robotic arm 24 and/or the coupling plate 26 are to be moved based on a scaled translational/rotational vector(s). The Jacobian kinematics provide for speed control while inverse kinematics provide for positional control. Other robotic control routines may be employed.

Advancing to block 112 in FIG. 3, the method 100 includes transforming coordinates to a robot base frame, which is the coordinate axis on the cart 44 where the base of the robotic arm 24 is mounted. The input force ($F_{boundary\ plane}$) may be converted to a scaled force ($F_{scaled}$) as:

$$[F_{scaled} = \alpha * Cam\_To\_Base * F_{boundary\ plane}]$$

Here alpha is a tunable scaling factor and Cam_To_Base is a 4×4 matrix coordinate transformation from a camera frame to the robot base frame. The reverse trajectory (V rev) is obtained by projecting the scaled force ($F_{scaled}$) onto the outer surface 502 (or planar surface 512) of the virtual sphere 500. As the boundary plane B is cleared by the body 420, the repulsing force tends to zero and the incremental step of the reverse trajectory 406 trends towards zero.

In a system with velocity or position-based joint limits, the output force may be converted into a displacement vector with a scaling constant, projected onto the input direction vector, and added to the input direction vector at each update cycle, resulting in motion away from the limit. The controller C is programmed to use the joint position data in conjunction with the compensated, filtered force/torque output data to perform this coordinate transformation. The transformation may include one or more predefined equations or relations based on the position and orientation of the sensors 32. The transformation may be based on parameters obtained via calibration.

Proceeding to block 114 of FIG. 3, the controller C is programmed to validate the command (implementing the reverse trajectory 406) to ensure that it is within operating parameters (e.g., duration, rotational speed, maximum current etc.) of a joint motor. Also, per block 112 of FIG. 3, the controller C is programmed to transmit the commands (via signals) to the appropriate joint motor of the robotic arm 24 and/or the coupling plate 26, according to the reverse trajectory 406. The transmitted commands cause motors at the respective joints to move the robotic arm 24 and/or the coupling plate 26, thereby causing the camera 12 to move while avoiding collisions.

The controller C of FIG. 1 may include, or otherwise have access to, information downloaded from remote sources and/or executable programs. Referring to FIG. 1, the controller C may be configured to communicate with a remote server 60 and/or a cloud unit 62, via a network 64. The remote server 60 may be a private or public source of information maintained by an organization, such as for example, a research institute, a company, a university and/or a hospital. The cloud unit 62 may include one or more servers hosted on the Internet to store, manage, and process data.

The network 64 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The network 64 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of connections may be employed.

The controller C of FIG. 1 may be an integral portion of, or a separate module operatively connected to the robotic imaging system 10. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts presented herein illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based devices that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A robotic imaging system comprising:
a body including a head unit, a robotic arm and a coupling plate coupling the head unit to the robotic arm, the robotic arm being adapted to selectively move the head unit;
a camera positioned in the head unit and configured to record one or more images of a target site, the camera being operatively connected to one or more handles;
a plurality of sensors configured to transmit sensor data, including:

at least one primary sensor configured to detect respective force and/or respective torque applied at the body, the at least one primary sensor being operatively coupled to the robotic arm; and at least one auxiliary sensor configured to detect the respective force and/or the respective torque applied at the one or more handles, the at least one auxiliary sensor being operatively coupled to the one or more handles;

a controller configured to receive the sensor data, the controller having a processor and tangible, non-transitory memory on which instructions are recorded; and wherein the controller is adapted to execute a contact management mode, including determining a contact location of the body with an external object based in part on the sensor data, and determining a reverse trajectory for moving the body away from the contact location.

2. The robotic imaging system of claim 1, wherein the camera is a stereoscopic camera configured to record a left image and a right image for producing at least one stereoscopic image of the target site.

3. The robotic imaging system of claim 1, wherein the plurality of sensors respectively includes a six-degrees-of-freedom haptic force-sensing device.

4. The robotic imaging system of claim 1, wherein the target site is an eye.

5. The robotic imaging system of claim 1, wherein the one or more handles include a first handle and a second handle rigidly affixed to and connected by a handlebar, the at least one auxiliary sensor being a single sensor positioned on the handlebar.

6. The robotic imaging system of claim 1, wherein the one or more handles include a first handle and a second handle, the at least one auxiliary sensor including a first auxiliary sensor affixed to the first handle and a second auxiliary sensor affixed to the second handle.

7. The robotic imaging system of claim 1, wherein the at least one primary sensor is located at a center point between the robotic arm and the camera.

8. The robotic imaging system of claim 1, wherein the plurality of sensors defines respective frames of reference, the controller being adapted to transform the respective frames of reference to a common frame.

9. The robotic imaging system of claim 1, wherein the controller is adapted to apply correction factors to the sensor data, including applying a low-pass filter.

10. The robotic imaging system of claim 1, wherein the controller is adapted to apply correction factors to the sensor data, including correcting for gravity for the plurality of sensors based on their respective location.

11. The robotic imaging system of claim 1, wherein the controller is adapted obtain a boundary plane extending through the contact location and perpendicular relative to a first direction.

12. The robotic imaging system of claim 11, wherein the reverse trajectory begins in a direction orthogonal to the boundary plane.

13. The robotic imaging system of claim 12, wherein the reverse trajectory is constrained to a surface of a virtual sphere.

14. The robotic imaging system of claim 1, wherein:

the sensor data provides a measured torque and a measured force at a measured location, the measured location and the contact location being connected by a displacement vector; and the controller is adapted to determine the applied torque at the contact location as a difference between the measured torque and an applied force crossed with the displacement vector.

15. A robotic imaging system comprising:

a body including a head unit, a robotic arm and a coupling plate coupling the head unit to the robotic arm, the robotic arm being adapted to selectively move the head unit;

a camera positioned in the head unit and configured to record one or more images of a target site, the camera being operatively connected to one or more handles;

a plurality of sensors configured to transmit sensor data, including:

at least one primary sensor configured to detect respective force and/or respective torque applied at the body, the at least one primary sensor being operatively coupled to the robotic arm; and at least one auxiliary sensor configured to detect the respective force and/or the respective torque applied at the one or more handles, the at least one auxiliary sensor being operatively coupled to the one or more handles;

a controller configured to receive the sensor data, the controller having a processor and tangible, non-transitory memory on which instructions are recorded; and wherein the controller is adapted to execute a contact management mode, including:

obtaining a contact location of the body with an external object based in part on the sensor data;

obtaining a boundary plane extending through the contact location, the boundary plane being perpendicular to a reference axis; and determining a reverse trajectory for the body to move away from the contact location.

16. The robotic imaging system of claim 15, wherein the one or more handles include a first handle and a second handle rigidly affixed to and connected by a handlebar, the at least one auxiliary sensor being a single sensor positioned on the handlebar.

17. The robotic imaging system of claim 15, wherein the one or more handles include a first handle and a second handle, the at least one auxiliary sensor including a first auxiliary sensor affixed to the first handle and a second auxiliary sensor affixed to the second handle.

18. The robotic imaging system of claim 15, wherein the reverse trajectory is constrained to a surface of a virtual sphere.

* * * * *